United States Patent [19]

Wang et al.

[11] Patent Number: 5,193,004
[45] Date of Patent: Mar. 9, 1993

[54] SYSTEMS AND METHODS FOR CODING EVEN FIELDS OF INTERLACED VIDEO SEQUENCES

[75] Inventors: Feng Ming Wang; Dimitris Anastassiou, both of New York, N.Y.

[73] Assignee: The Trustees of Columbia University in the City of New York, New York, N.Y.

[21] Appl. No.: 621,343
[22] Filed: Dec. 3, 1990
[51] Int. Cl.$^5$ .............................................. H04N 7/133
[52] U.S. Cl. .................................... 358/136; 358/105; 358/133
[58] Field of Search ................. 358/136, 135, 133, 105

[56] References Cited

U.S. PATENT DOCUMENTS

| | | | |
|---|---|---|---|
| 4,821,119 | 4/1989 | Gharavi | 358/136 |
| 4,897,720 | 1/1990 | Wu et al. | 358/136 |
| 4,999,705 | 3/1991 | Puri | 358/136 |
| 5,001,559 | 3/1991 | Gonzales | 358/135 |
| 5,049,991 | 9/1991 | Niihara | 358/136 |
| 5,134,480 | 7/1992 | Wang | 358/105 |

FOREIGN PATENT DOCUMENTS 0374548 6/1990 European Pat. Off.

OTHER PUBLICATIONS

Puri, A. et al. *Video Coding with Motion-Compensated Interpolation for CD-ROM Applications*, Image Communication, vol. 2, No. 2 pp. 127–144 Aug. 1990.
Burt, P. J. et al., *The Laplacian Pyramid as a Compact Image Code*, IEEE Transactions on Communications, vol. COM-31, No. 4 Apr. 1983.
Uz, K. M. et al., *A Multiresolution Approach to Motion Estimation and Interpolation with Application to Coding of Digital HDTV*, Proceedings, 1990 International Symposium on Circuits and Systems, p. 1298.
Barbero, M. et al., *A System for the Transmittion of HDTV Signals Based on the Discrete Cosine Transform*, Proceedings, 1990 IEEE International Symposium on Circuits and Systems, pp. 1887–1890.
Yashima, Y. et al. *HDTV/Standard-TV Compatible Coding Based on DCT*, Proceedings, 1990 International Symposium on Circuits and Systems, pp. 1894–1898.
Fleischler, P. E. et al., *Coding of Advanced TV for BISDN using Multiple Subbands*, Proceedings, 1990 International Symposium on Circuits and Systems, pp. 1314–1317.
Anastassiou, Dimitris et al., *Gray-Scale Image Coding for Freeze-Frame Videoconferencing*, IEEE Transactions or Communications, vol. 34, No. 4 Apr. 1986.
International Organization for Standardization Simulation Model Editorial Group, *MPEG Video Simulation Mode Three*, Jul. 25, 1990.
Anastassiou, D., *Generalized Three-Dimensional Pyramid Coding for HDTV Using Nonlinear Interpolation*, Columbbia University.
Anastassiou, D., *Generalized Pyramid Coding Using Nonlinear Using Nonlinear Interpolation for HDTV Coding*, Proceedings, 1990 Picture Coding Symposium.
Wang, F. and Anastassiou, D., *Time Recursive Deinterlacing for IDTV and Pyramid Coding*, Image Communication, vol. 2, No. 3, Oct. 1990.
Netravali, A. N. and Haskell, B. G. "*Digital Pictures: Representation and Compression*", Plenum Press, 1988.

Primary Examiner—Howard W. Britton
Attorney, Agent, or Firm—Brumbaugh, Graves, Donohue & Raymond

[57] ABSTRACT

In accordance with the invention, a method, for coding multi-mode predictive interpolative coded fields of video, includes the steps of:
(a) providing a current field of interlaced pixel data, and past and future fields of such data;
(b) providing estimated pixel data at omitted line positions in the past and future fields of data to form enhanced fields of pixel data;
(c) comparing a block of pixel data from the current field with corresponding blocks of data from such past and future fields to derive motion vector signals indicative of best matched blocks of data;
(d) developing pixel error signals representing pixel by pixel errors based on utilization of best matched blocks in different modes for comparison with the block of pixel data from the current field and developing best mode signals indicative of which of such modes represents the least overall error; and
(e) providing the best mode signals, motion vector signals, pixel error signals, and the future odd field of data for transmission for use by a decoder.

45 Claims, 9 Drawing Sheets

COORDINATE OF DCT BLOCK

ZIG-ZAG ORDER

SYSTEMS AND METHODS FOR CODING EVEN FIELDS OF INTERLACED VIDEO SEQUENCES

BACKGROUND OF THE INVENTION

This invention relates to methods and systems for coding alternate fields of an interlaced video format and has particular applicability to arrangements wherein the other fields have already been coded.

Interlaced scanning is an efficient method of bandwidth compression for television transmission. Further bandwidth compression can be achieved by downsampling the interlaced video sequence by deleting either all the even or all the odd fields. This scheme is used, for example, in the current Motion Picture Experts Group (MPEG) proposal relating to coding and decoding protocols for the compression of video data. In that proposed format only the odd fields of an interlaced video sequence are encoded and transmitted. The present invention, utilizing the fact that even and odd fields are highly correlated, makes it possible to code the missing even fields very efficiently.

It is therefore the object of this invention to provide methods and systems for efficiently coding one field of an interlaced video.

It is a further object of this invention to provide methods and systems for coding interlaced video data so as to permit efficient and accurate decoding using methods and systems also in accordance with the invention.

SUMMARY OF THE INVENTION

In accordance with the present invention, a system, for multi-mode predictive interpolative coding of fields of video, includes input means for coupling current and later fields of interlaced data, such fields including even fields having pixel data for line positions at which pixel data is omitted in prior and later odd fields, separator means for separating even fields of data from odd fields of data and delayed coupling means for providing past odd field data. The system also includes storage means for storing data and for providing past even field data from storage and interpolation means, coupled to receive current even, future odd and past odd fields of data, for deriving and coupling to the storage means enhanced fields of data corresponding to each of such fields of data and having estimated pixel data at omitted line positions. Block matching means are included for comparing current even enhanced field data with each of the future odd and past odd enhanced fields and past even field data to develop motion vector signals indicative of location of best matched blocks of future odd, past odd and past even data, and for coupling motion-vector signals to the storage means. The system further includes comparator means for utilizing blocks of pixel data retrieved from storage in response to motion vector signals for performing a plurality of mode comparisons of a block of current even pixel data with different ones of the best matched blocks alone or on an averaged basis for deriving a best mode signal representative of a single best mode block having the least error and deriving pixel error signals representing pixel by pixel errors in the best mode block, and output means for providing pixel error signals, best matched block location signals based on motion vector signals corresponding to the best mode signal, and odd field pixel data signals for transmission for use by a decoder.

Also in accordance with the invention a system, for decoding coded fields of video, includes input means for coupling location signals providing location data for best matched blocks, pixel error signals representative of pixel value errors in a best mode block relative to a current even field of pixel data, and odd field pixel data signals, and storage means for storing fields of pixel data, including a future odd field and past odd and even fields. Address generator means are included for providing address signals for retrieving one or more blocks of pixel data from stored future odd and past odd and even fields, and block coupling means provide a single best mode data block regardless of the number of blocks of pixel data simultaneously retrieved, and includes means for averaging simultaneously retrieved blocks of pixel data. Also included are block adder means for combining pixel error signals with the single best mode data block to provide a block of current even field pixel data, and combiner means for providing video signals including alternating odd and even fields of data.

Further in accordance with the invention, a method, for coding multi-mode predictive interpolative coded fields of video, includes the steps of:
 (a) providing a current field of interlaced pixel data, and past and future fields of such data;
 (b) providing estimated pixel data at omitted line positions in the past and future fields of data to form enhanced fields of pixel data;
 (c) comparing a block of pixel data from the current field with corresponding blocks of data from such past and future fields to derive motion vector signals indicative of best matched blocks of data;
 (d) developing pixel error signals representing pixel by pixel errors based on utilization of best matched blocks in different modes for comparison with the block of pixel data from the current field and developing best mode signals indicative of which of such modes represents the least overall error; and
 (e) providing the best mode signals, motion vector signals, pixel error signals, and the future odd field of data for transmission for use by a decoder.

Also in accordance with the invention a method, for decoding coded fields of video, includes the steps of:
 (a) receiving location signals providing location data for best matched blocks of data, pixel error signals representative of pixel value errors in a best mode block relative to a current even field of data, and odd field pixel data signals;
 (b) storing fields of pixel data which, relative to the current even field, include a future odd field and past odd and even fields;
 (c) deriving, with use of location signals, address signals used in retrieving from storage one or more blocks of pixel data from stored future odd and past odd and even fields;
 (d) providing an averaging function, responsive to blocks of pixel data retrieved in step (c), to provide a single best mode data block regardless of the number of blocks of pixel data simultaneously retrieved from storage;
 (e) combining the best mode data block with such pixel error signals to derive a block of current even field pixel data; and
 (f) assembling even fields of data for combination with the odd fields of data to provide video signals including alternating odd and even fields.

For a better understanding of the present invention, together with other and further objects, reference is

DESCRIPTION OF THE INVENTION

Figure 1:
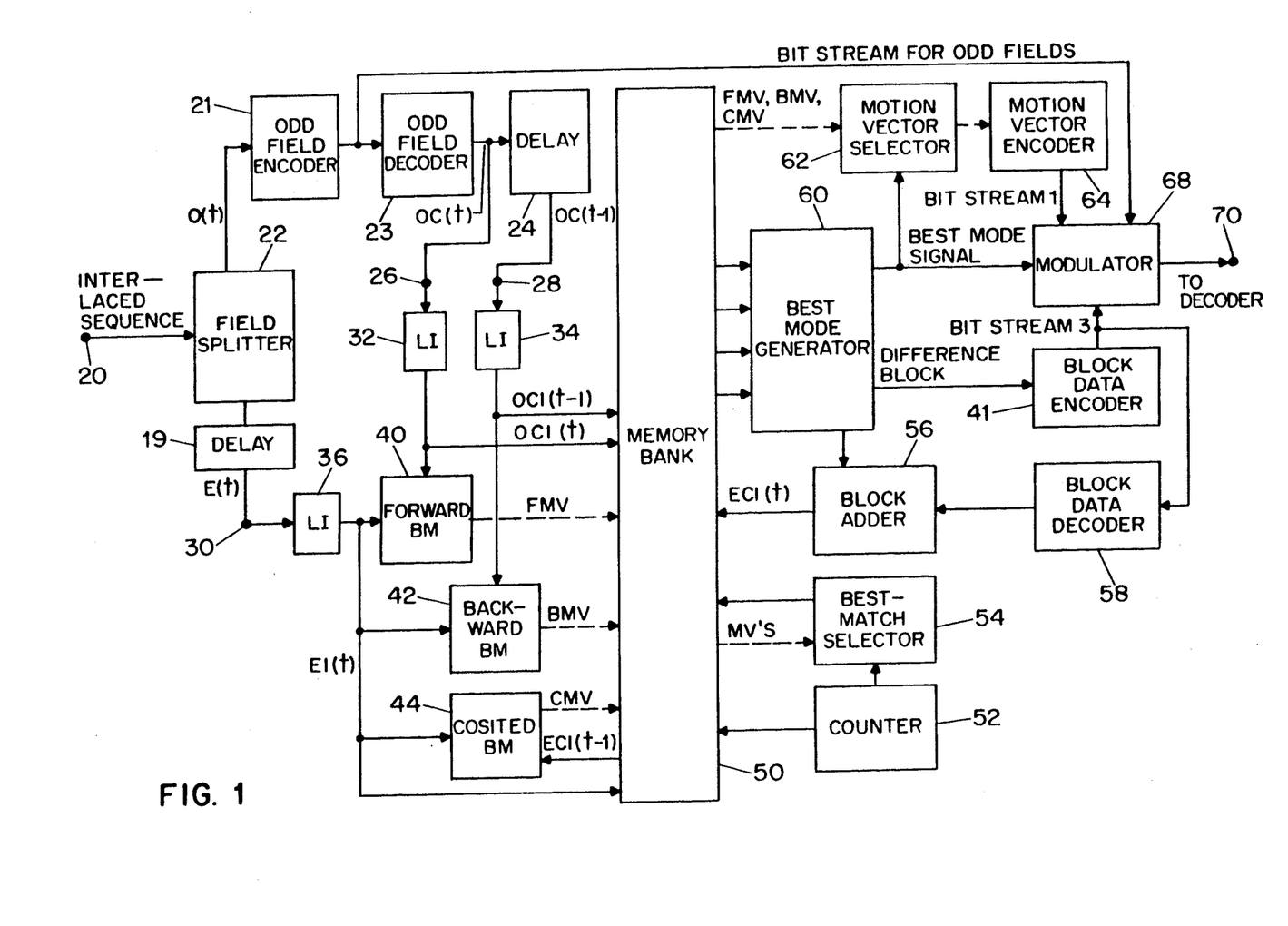
FIG. 1 shows the a system diagram of an encoder in accordance with the invention.

Referring now to FIG. 1, there is illustrated a system for coding alternate fields of an interlaced video sequence for transmission to a decoder. Thus, for frames of video made up of successive odd and even fields of video data, the FIG. 1 system is useable for coding the even fields for example.

Figure 2:
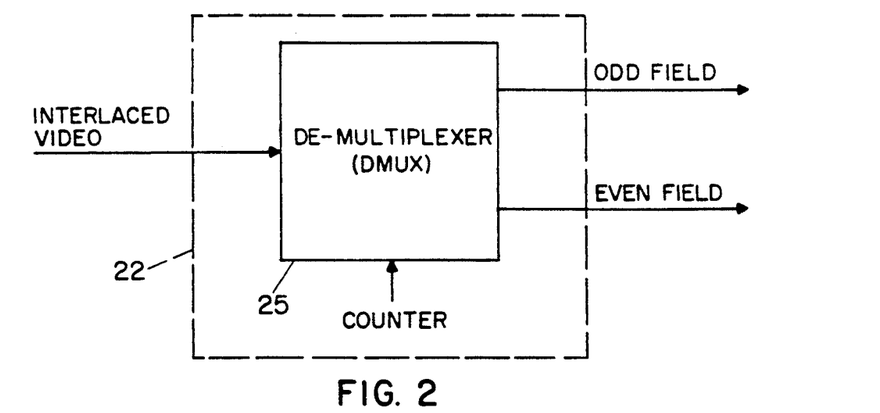
FIG. 2 shows a field splitter useful in the FIG. 1 encoder.

As used herein:

"field" refers to an incomplete frame of data, for example, the alternate fields of an NTSC television signal;

"frame" refers to a complete frame of data, for example, the composite of two fields of NTSC data;

In FIG. 1 the encoder includes input means shown as terminal 20 for receiving an interlaced video sequence and separator means, shown as field splitter 22, for separating odd fields of data O(t) from even fields of data E(t). FIG. 2 is an illustration of a suitable field splitter. A de-multiplexer, shown as DMUX unit 25 takes an interlaced video sequence and uses a counter as a control signal. When the output of the counter is even, the "Even" output port of the 2-to-1 DMUX is selected, otherwise the "Odd" output port is selected.

The odd field data is encoded by unit 21 and provided to modulator unit 68. Encoded odd field data is decoded by unit 23. In this way any errors introduced by coding and decoding will be taken into account during the block matching process. Decoded odd field data is designated Oc(t).

Delayed coupling means, including delay units 19 and 24 are arranged so that when an odd field of data, denoted as Oc(t) for reference timing purposes, is supplied to a point 26, the previous odd field of data denoted as Oc(t−1) and the even field of data E(t) are simultaneously supplied to points 28 and 30. Thus at any given iteration of the system's operation, the fields Oc(t), Oc(t−1) and E(t) are simultaneously available at 26, 28 and 30 respectively.

The encoder also includes interpolation means, shown as linear interpolators (LI) 32, 34, and 36 which may be separate channels of a single interpolation unit, effective to fill in an approximation of the pixel data at missing lines of each individual field of data by interpolation of pixel data at corresponding positions in preceding and succeeding lines of the same individual field. This provides full frames of alternating lines of actual input pixel data and interleaved lines of interpolated data, at the frame rate. These interpolated fields will be referred to as enhanced fields. Non-linear interpolation is also possible. As shown, unit 32 receives the current odd field input data Oc(t) from the separator means, via encoder unit 21 and decoder unit 23, and its output is an enhanced field version Oci(t). Similarly, unit 34 receives past odd field Oc(t−1) from delay unit 24 and its output is an enhanced field version Oci(t−1). Similarly, interpolation unit 36 receives the current even field of input data E(t) from the separator and its output is an enhanced field version Ei(t). The interpolation means provide Oci(t), Oci(t−1) and Ei(t) to memory bank 50 and to block matching means.

Figure 3:
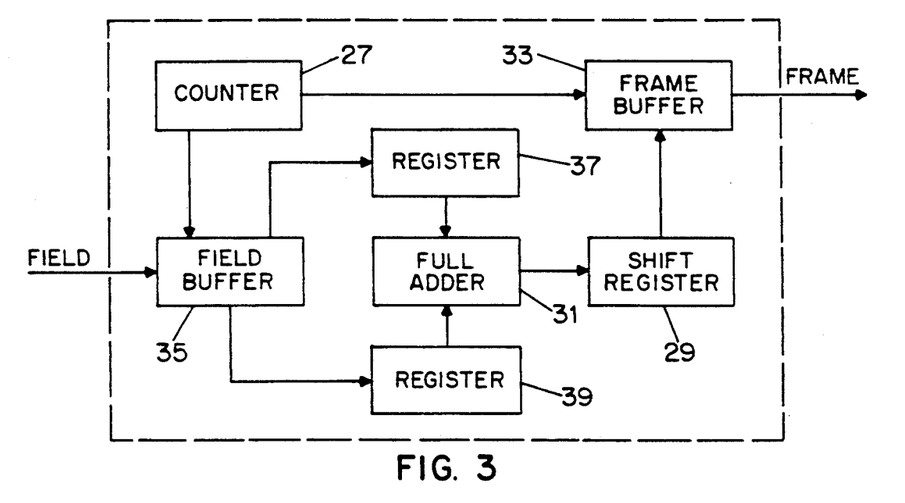
FIG. 3 shows a linear interpolator useful in the FIG. 1 encoder.

Referring to FIG. 3, there is illustrated an embodiment of an interpolation circuit suitable for units 32, 34 and 36. In FIG. 3, linear interpolations are performed between two scanning lines of one field to generate the missing intermediate line. This is done by a full adder means 31 and a shift register 29 for each missing pixel. As shown, the input field containing only even or odd lines of a frame is input to field buffer 35. Under the control of values provided by counter means, two pixels are selected which are at the same horizontal position on two consecutive lines (i.e., the lines before and after the missing line position) and stored separately in the two registers 37 and 39. The values of the two pixels are then added in means 31 and shifted to the right by one bit one bit in shift register 29, which is the equivalent to dividing the sum of the two pixel values by a factor of two. The same process is applied for every missing pixel of the field, sequentially. In practice, this sequence of operations is performed in parallel through use of additional adder and register combinations. The output signal of units 32, 34 and 36 are linearly interpolated enhanced fields. As indicated, inputing Oc(t) to unit 32 results in the interpolated output Oci(t) and similarly, interpolating of input Oc(t−1) results in interpolated output Oci(t−1) and interpolating of E(t) results in interpolated output Ei(t).

Block matching means, shown as forward, backward and cosited block matching (BM) units 40, 42 and 44, may also be separate channels of a single unit. The block matching means receive as input the enhanced fields of data Ei(t), Oci(t), Oci(t−1) and Eci(t−1). Eci(t−1), the previous even field of data, is received from memory bank 50 where it has been stored after having been derived in the previous iteration of the encoder.

The block matching means finds for each given block of pixels in Ei(t), the corresponding blocks in Oci(t), Oci(t−1) and Eci(t−1) which match the given block in Ei(t) most closely. These can be referred to as the best matched forward, backward and cosited blocks. The block matching means then calculates an appropriate motion vector to each of the identified best matching blocks and outputs that data to memory bank 50. Thus "fmv" is the appropriate motion vector indicating which block in Oci(t) best matches the appropriate block in Ei(t). Similarly "bmv" is the appropriate motion vector indicating which block in Oci(t−1) best matches the appropriate block in Ei(t). Finally, "cmv" represents the appropriate motion vector indicating which block in Eci(t−1) best matches the appropriate block in Ei(t). In the present embodiment, blocks of 16×16 pixels are used for motion compensated block matching. Block matching techniques are known and block matching units 40, 42, and 44 may appropriately use block matching as shown in U.S. Pat. No. 4,897,720 by Wu and Yang.

The counter 52 and best-match selector 54 use the motion vector information to generate addresses for the best matched blocks in memory bank 50 corresponding to block in Ei(t) being matched.

Memory bank 50 can be composed of random access memory (RAM) chips which have to be big enough to hold five M×N images (M and N are the width and height in terms of pixels of one image) and three sets of N/16×M/16 motion vectors.

Best mode generator means 60 receives as input each block of Ei(t) and the best matched forward, backward and cosited blocks found by the block matching means. Concurrently, motion vector selector, shown as unit 62, receives the motion vector values for each of the best matched blocks. The best mode generator determines which of the best matched blocks most closely matches the appropriate block in Ei(t). These different comparisons are known as modes. Thus there can be a forward mode, a backward mode and a cosited mode based on a comparison of a specific block of pixel data from Ei(t) with the best matched blocks of future odd, past odd and past even pixel data, respectively. The best mode generator can also create and compare blocks which are averages of two or more of the best matched blocks which are received from the block matching means. These averaged modes can be based on any averaged combination of the best matched blocks. In certain applications, the most useful averaged modes have been found to be combinations of the past even and future odd blocks and of the past and future odd blocks from their respective enhanced fields of pixel data. The best mode generator then picks from among those modes the overall best matched block, also known as the best mode block.

After selecting the best mode block, the best mode generator generates three different outputs; the best mode block, a difference block and a signal to motion vector selector unit 62 and modulator unit 68 indicating which mode has been selected. Motion vector selector unit 62 then sends the motion vector information regarding the appropriate block or blocks (in the case of an averaged mode) to motion vector encoder 64. Unit 64 encodes the motion vector data and provides it to modulator 68. The motion vector encoder uses variable length coding (VLC) which is based on a look-up table that stores the binary codes for all possible motion vectors. The look-up table is custom definable, however the present invention uses the same one which is used in the current MPEG proposal.

Figure 4:
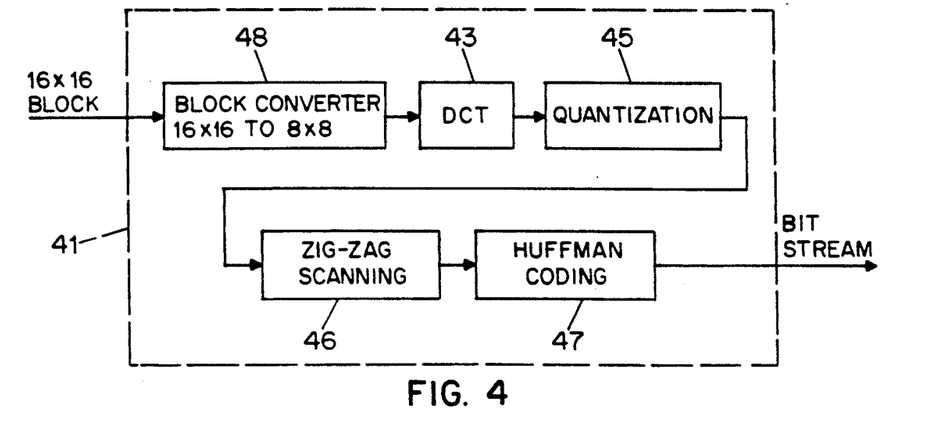
FIG. 4 shows a block data encoder useful in the FIG. 1 encoder.

The difference block is the result of a pixel by pixel subtraction of the values of the overall best mode block from the block in Ei(t). The difference block is then coded by block data encoder 41 and provided to modulator unit 68. Data encoder 41 is illustrated in more detail in FIG. 4. Unit 48 converts the 16×16 blocks received from the best mode generator to four 8×8 blocks. A discrete cosine transform is applied to the difference block data by DCT unit 43. The transform is performed on blocks of an 8×8 size The 8×8 discrete cosine transform is defined as:

$$X(u,v) = (\tfrac{1}{4})C(u)C(v) \sum_{i=0}^{7}\sum_{j=0}^{7} x(i,j)\cos\left(\frac{(2i+1)u\pi}{16}\right)\cos\left(\frac{(2j+1)v\pi}{16}\right)$$

where $x(i,j)$, $i,j=0,\ldots,7$, is the pixel value, $X(u,v)$, $u,v=0,\ldots,7$, is the transformed coefficient, $$C(0) = \frac{1}{\sqrt{2}},$$

and $C(u)=1$, $u,v=1,\ldots,7$. DCT is well known in the art, and there are IC chips available for this purpose.

Figure 5:
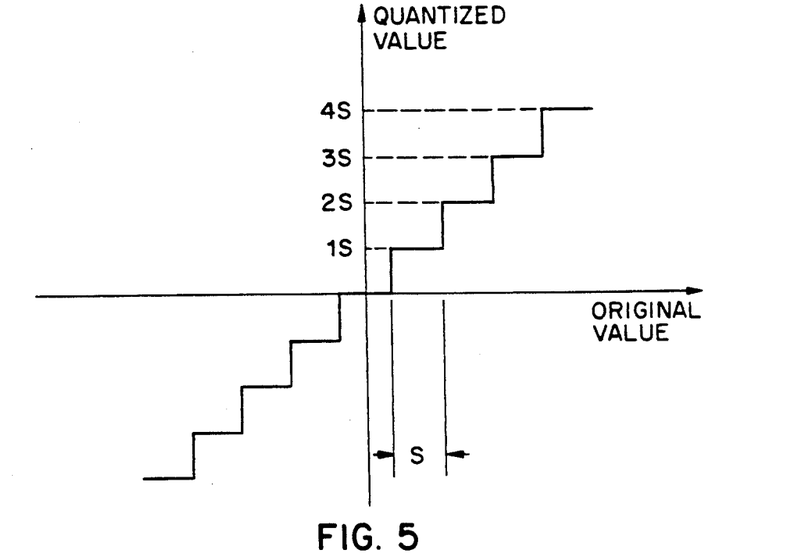
FIG. 5 shows a uniform quantization table used for coding block data.
Figure 6:
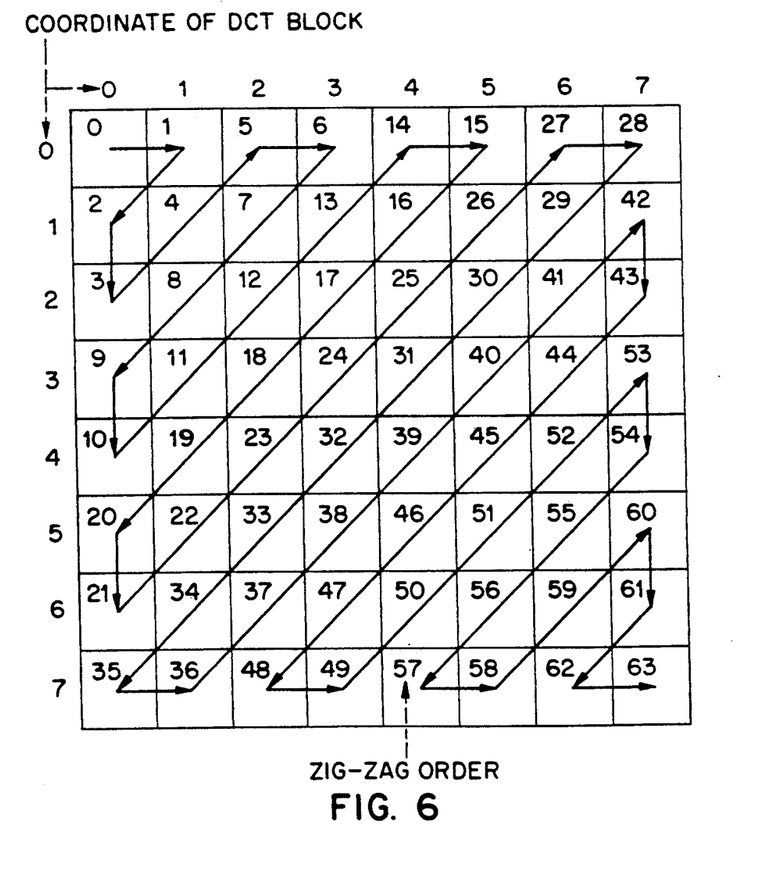
FIG. 6 shows a zig-zag scanning diagram of an 8×8 DCT block.

To achieve higher coding efficiency, the DCT coefficients are quantized by a uniform quantizer, shown in FIG. 5, with a fixed step S. The values of S, which are stored in a quantization table, typically vary from one coefficient to another. While FIG. 5 shows linear quantization, non-linear quantization is also possible. In the present instance the quantization table which is used is the current MPEG standard. Other quantization tables, however, are useable. After quantization, the DCT blocks contain a large amount of zero coefficients. Known techniques of zig-zag scanning may be applied to the DCT blocks in order to maximize the runs of zero coefficients and thereby effectuate higher data compression. The zig-zag scanning is implemented by a look-up table, shown in FIG. 6, which maps coordinates of DCT coefficient blocks to values between 0 and 63. This represents the order of variable length coding. A known form of Huffman coding may then be applied to convert the quantized DCT coefficients to binary codes. In the present instance, the MPEG VLC table is used for these purposes although other tables are also useable.

Figure 7:
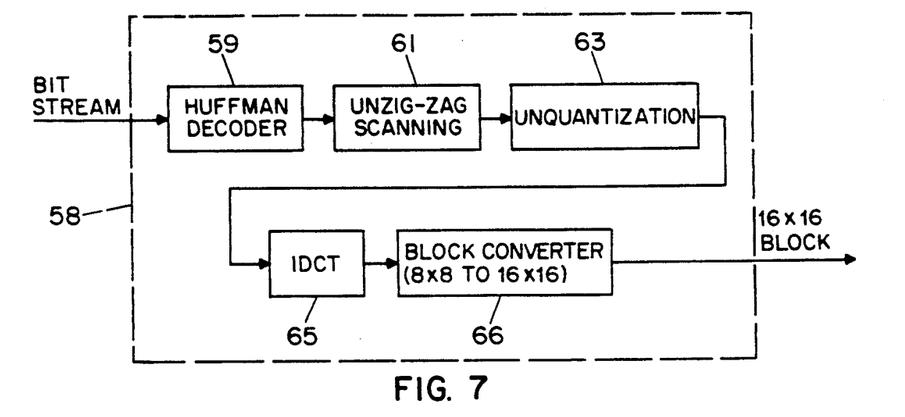
FIG. 7 shows a block data decoder useful in the FIG. 1 encoder and the FIG. 13 decoder.

The coded difference block data is also provided to block data decoder 58 shown in FIG. 7. The block data decoder performs the reverse operations in the reverse order of the encoder. First the coded data is Huffman decoded and next unzig-zag scanning is applied. The data is then unquantized and an inverse discrete cosine transform is applied using known techniques. The decoder uses the same tables as the encoder. The output of block data decoder 58 is provided to block adder 56. Block adder 56 also receives the best mode block from the best mode generator. It adds the difference block to the best mode block to create the same even field which will be recreated by the decoder. That even field is then provided to memory bank 50 where it will be used as the cosited past even field by cosited block matching unit 44 during the next iteration of the system.

Modulator unit 68 then combines the four sets of data it has received (odd field data, coded motion vector data, coded difference block data and best mode signal data) and provides an appropriate signal to terminal 70. From there the data can be sent to an appropriate decoder.

Figure 8:
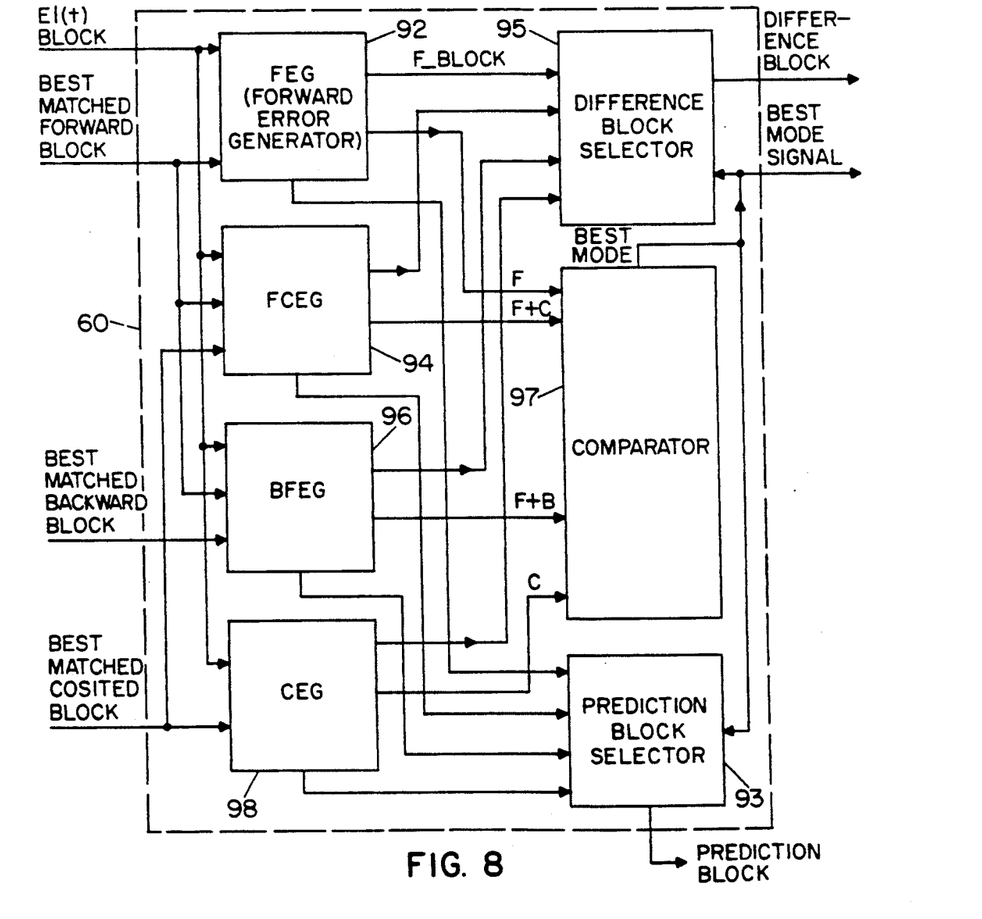
FIG. 8 shows a best mode generator useful in the FIG. 1 encoder.

FIG. 8 illustrates a suitable embodiment of the best mode generator 60. The best mode generator includes four error generators shown as forward error generator (FEG) 92, average error generator (FCEG) 94, average error generator (BFEG) 96 and cosited error generator (CEG) 98. The error generators receive as input a block from Ei(t) and the appropriate best matched blocks.

The forward error generator FEG compares the appropriate block in Ei(t) to the best matched forward block. The cosited error generator CEG compares the appropriate block in Ei(t) to the best matched cosited block.

The average error generators receive two or more best matched blocks which they average together to produce an average block. This average block is then compared to the appropriate block in Ei(t). Thus average error generator BFEG creates a block which is the average of the best matched backwards block and the best matched forward block. Similarly the average error generator FCEG creates a block which is the average of the best matched forward block and the best matched cosited block. Averaging can be done by adding pixel values from the two blocks on a pixel by pixel basis and reducing each resulting pixel value by a factor of two (i.e. dividing each value in half).

From these inputs the error generators produce three outputs; a prediction block, a difference block and an absolute error.

The prediction block is the block which the error generator compares to the appropriate block in Ei(t). Thus in the case of FEG or CEG, the prediction block is just the best matched block received from the block matching units. In the case of the average error generators, the prediction block is the average of two or more best matched blocks. The prediction blocks are outputted to the prediction block selector 93.

The difference block is calculated by subtracting the value of a pixel in one block from the value of the corresponding pixel in the other block on a pixel by pixel basis. This value of this difference is then assigned to a corresponding pixel in the difference block. The sum of the absolute value of all of these pixels in the difference block is the absolute error.

The difference blocks are provided to the difference block selector unit 95. The absolute errors are outputted to comparator unit 97. Based on the absolute errors the comparator chooses the best mode. Typically this is the mode having the least absolute error, however, other selections are possible. This is referred to as the best mode. The comparator then supplies a signal indicating the best mode to the difference block selector unit 95, modulator unit 68, motion vector selector unit 62 and to the prediction block selector 93. Upon receipt of the signal the difference block selector sends the appropriate difference block to block data encoder 41, and the prediction block selector sends the appropriate prediction block (the best mode block) to block adder 56.

Figure 9:
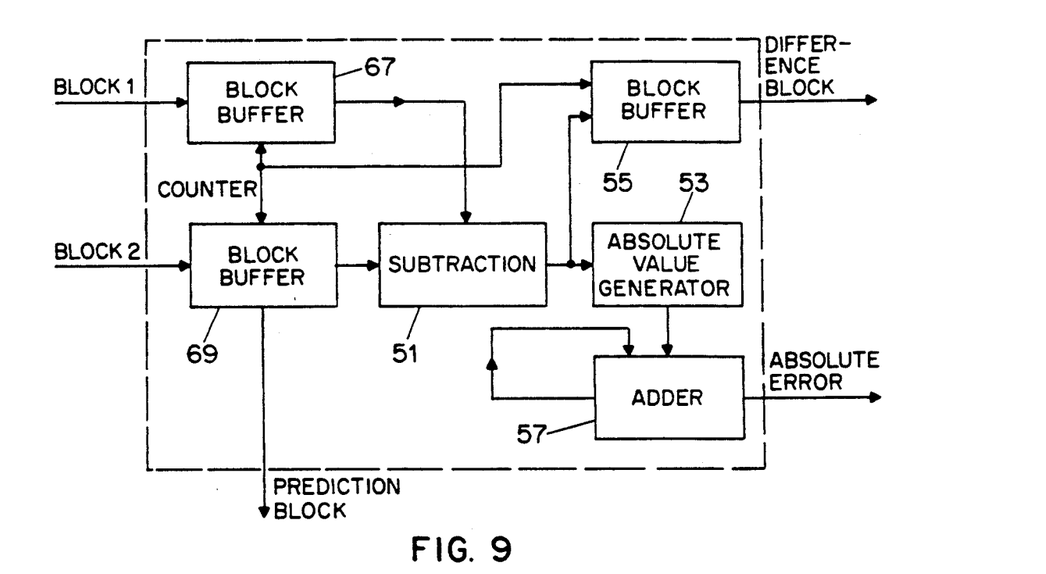
FIG. 9 shows an error generator useful in the FIG. 8 best mode generator.

Referring to FIG. 9, there is illustrated an embodiment of a suitable error generator circuit for either the forward error generator FEG or the cosited error generator CEG. In FIG. 9 buffer block unit 67 and buffer block unit 69 receive a block from Ei(t) and the best matched block from either Oci(t) or Eci(t−1). Subtraction unit 51 calculates the difference in value of each set of corresponding pixels in the two blocks and assigns that value to a corresponding pixel value in block buffer 55. This is known as the difference block. Absolute value generator 53 converts the value of the difference for each set of pixels to an absolute value and provides that information to the adder unit 57. The adder unit 57 sums all of the absolute values for the differences of the two blocks being compared to create an absolute error value.

Figure 10:
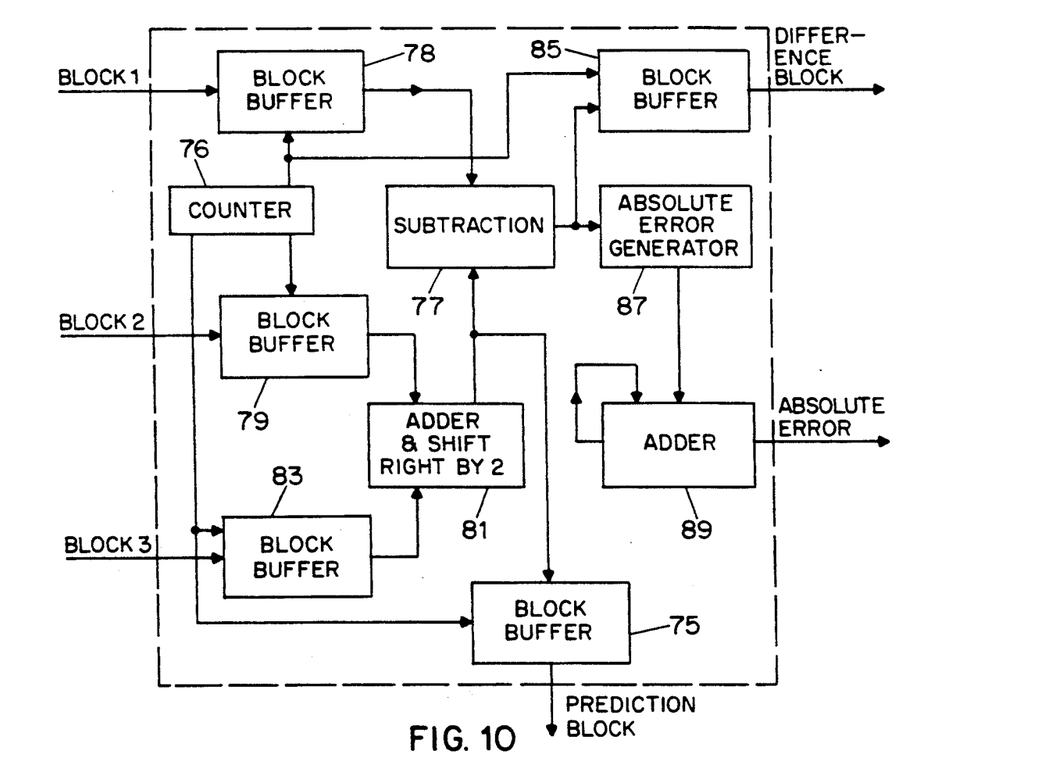
FIG. 10 shows an average error generator useful in the FIG. 8 best mode generator.

Referring to FIG. 10, an embodiment of a suitable average error generator circuit is shown. Block buffer 78 receives a block in Ei(t). Block buffers 79 and 83 receive the best matched blocks from the fields being averaged to create a block. In the case of error generator BFEG, the best matched blocks from Oci(t−1) and Oci(t) are used. In the case of average error generator FCEG, the best matched blocks from Oci(t) and Eci(t−1) are used. The values of each of the corresponding pixels in each of the best matched blocks is added and divided by two to create an average block. This is accomplished by unit 81. This average block is then subtracted from the corresponding block in Ei(t) by subtraction unit 77. In the same fashion as the other error generators, both a difference block and an absolute error value is created.

Figure 11:
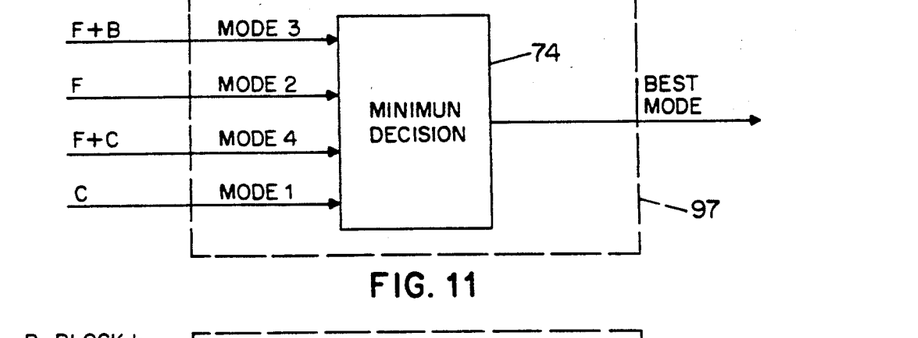
FIG. 11 shows a comparator useful in the FIG. 8 best mode generator.

Referring to FIG. 11, a suitable embodiment of the comparator unit 97 is shown. Minimum decision unit 74 picks the least value of the four absolute error inputs and outputs an appropriate best mode signal. While the current embodiment picks the mode with the least possible absolute error, other decision criterion are also available.

Figure 12:
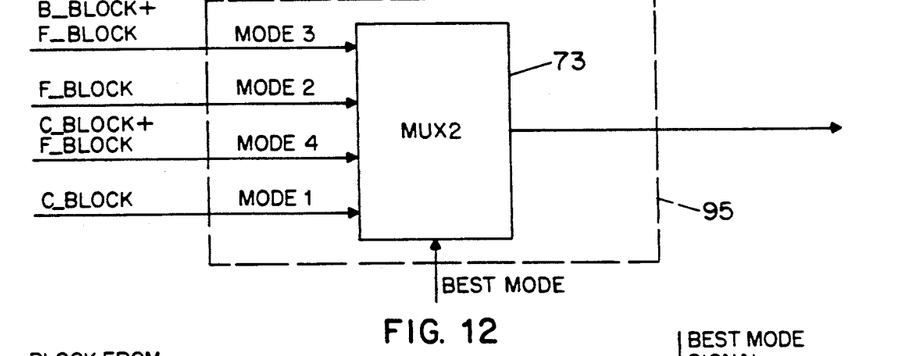
FIG. 12 shows a block selector useful in the FIG. 8 best mode generator.

Referring to FIG. 12, a suitable embodiment of a difference block selector is shown. Multiplexer unit 73 receives the four difference blocks as input. Responsive to the best mode signal, unit 73 outputs the appropriate difference block.

Decoder Description

Because the implemented coding scheme is very unsymmetrical, the decoder is simpler than the encoder. This is due largely to the fact that the decoder does not have to perform block matching or make a best mode determination.

Figure 13:
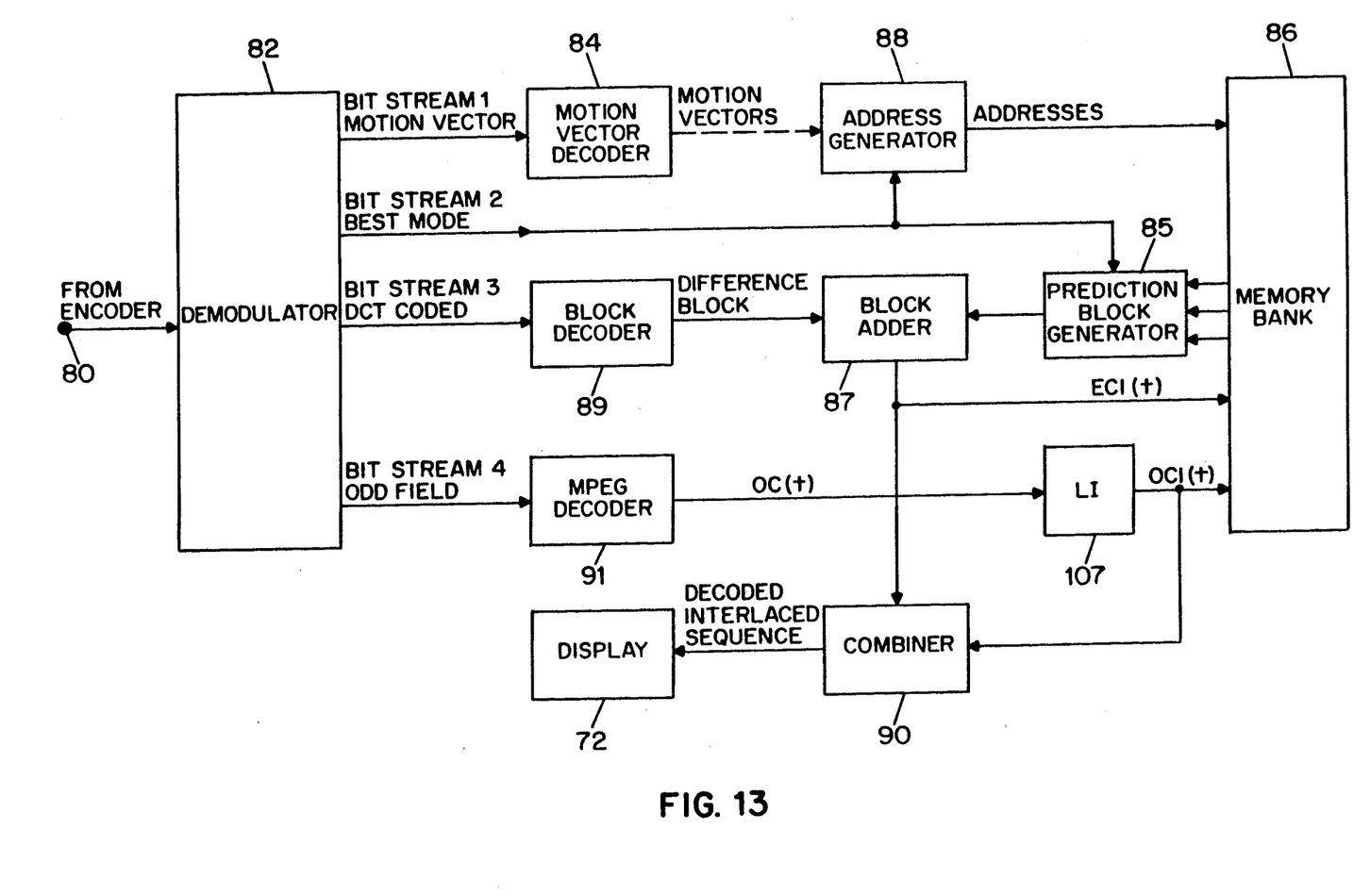
FIG. 13 is a system diagram of a decoder according to the invention.

In FIG. 13, the decoder includes input means, shown as terminal 80, for receiving encoded data. Demodulating means, shown as demodulator unit 82 separates the encoded data into four bit streams: location signals in the form of a motion vector bit stream, a best mode signal bit stream, pixel error signals in the form of a difference block bit stream and an odd field data signal bit stream.

The first bit stream, containing the motion vector data, is decoded by a motion vector decoder 84 which uses the same VLC table as used in the encoder. The motion vector decoder 84 segments the bit stream into portions which represent one or two different motion vectors. Using the VLC table, the decoder provides the corresponding motion vectors. The motion vectors represent the displacement of the best matched blocks from the original blocks in Ei(t). The motion vector decoder supplies the motion vectors to address generator unit 88. The address generator also receives the best mode signal from demodulator unit 82. The address generator uses the decoded motion vectors and the best mode signal to generate memory addresses of one or more of the best matched future odd, past odd and past even blocks, depending on the specific motion vector signals and the best mode signal. These blocks are sometimes referred to as the best matched forward, backward and cosited blocks, respectively.

In an alternative arrangement, only three bit streams need to be sent. In this arrangement the best mode signal and the motion vector would be combined in to an address bit stream which would describe where in the receiver's memory the appropriate best matched blocks could be found.

Figure 14:
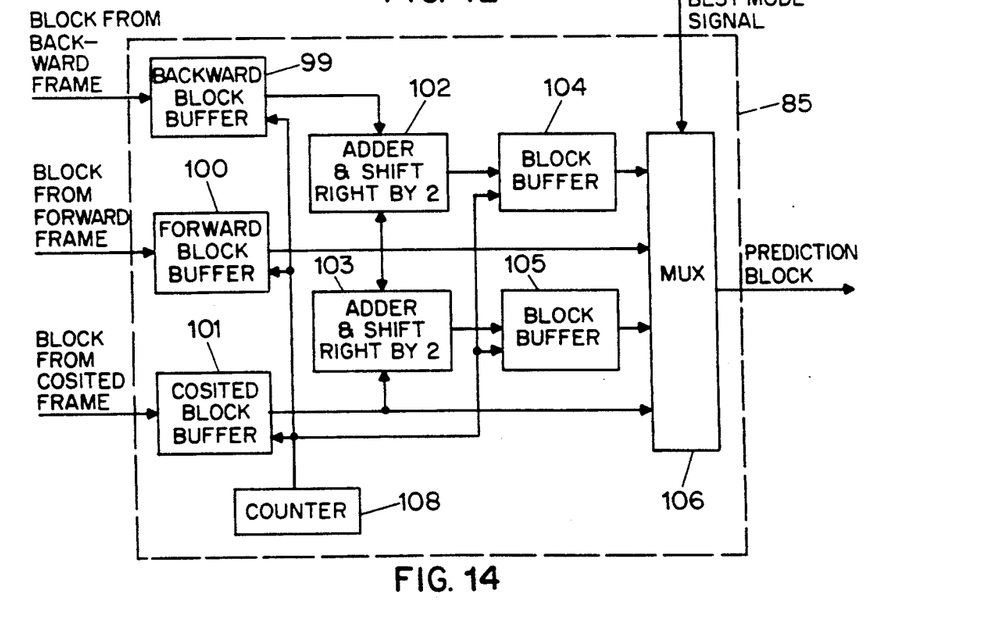
FIG. 14 is a block coupling unit useful in the FIG. 13 decoder.

Block coupling means, shown as prediction block generator unit 85, receives the best matched forward, backward and cosited blocks from storage means shown as memory bank 86. It also receives the best mode signal from demodulator 82. Unit 85 then generates the same mode data block which was identified in the encoder. The mode data block is then provided to block adder unit 87. Referring more specifically to FIG. 14, a suitable embodiment of block generator 85 is shown. The best matched block or blocks representing the best mode data block are received from memory bank 86 into the appropriate block buffers. In this embodiment the two average modes are created by units 102 and 103. The two other modes which merely use best matched blocks, are already available as received in the appropriate buffers. In operation, only the best matched block or blocks needed to provide the desired best mode block are supplied to block generator unit 85. Thus, if either the future odd block or past even block represents the best mode block, only the respective desired block is received by unit 85 and it is coupled by unit 85 to block adder unit 87. If, however, the best mode block is the block of data representing an average of the past even block and the future odd block, those blocks are provided from memory to buffers 100 & 101, respectively, for averaging in unit 103 and coupling to block adder unit 87. Operation is similar via buffers 99 and 100 and unit 102, when the best mode block represents the average of the past and future odd field best matched blocks. As illustrated, unit 85 is responsive to the best mode signal in implementing the averaging function, however, in other applications unit 85 need only be arranged to simply pass through any single input block and, in response to the input of two blocks simultaneously, to provide an averaged output to unit 87 whenever two blocks are received. In operation of unit 85 as illustrated, the appropriate mode is then loaded into MUX unit 106, which outputs the appropriate prediction block to block adder unit 87.

Block decoder unit 89 decodes the difference blocks and then provides the difference block to the block adder unit 87 where it is added to the single best mode data block from unit 85. Referring more specifically to FIG. 7 there is an illustration of the decoder 89. This decoder is of the same design as the decoder unit 58 in the FIG. 1 encoder. Units 59, 61, 63, and 65 respectively perform the following functions in sequence: Huffman decode, unzig-zag scan, unquantize and inverse discrete cosine transform, upon the incoming coded difference block data. Unit 66 reassembles the four 8×8 blocks into one 16×16 block.

The combination by block adder unit 87 of the best mode block and the difference block creates the coded field Eci(t). This field is then provided to memory bank 86 where it can be used to recreate the next even field. It is also provided to combiner means shown as unit 90.

The fourth bit stream outputted by demodulator unit 82 is the coded odd field data. This data is provided to decoder unit 91, which may provide MPEG type coding compatible with prior encoding. The decoded odd field data is provided to linear interpolator 107 which operates in the same fashion as the linear interpolator units in the encoder. Thus enhanced field of data Oci(t) is created and sent to combiner unit 90 and memory bank 86. Memory bank 86 uses Oci(t) and Oci(t−1) pixel field data which was created in the system's previous iteration, to generate the appropriate blocks for block coupling means 85. As previously mentioned, Eci(t) and hence Eci(t−1) are available also from storage in memory bank 86.

Combiner unit 90 drops half the lines out of both the even and odd enhanced fields of data it receives, Eci(t) and Oci(t) and sequentially combines them to provide reconstruction of the interlaced sequence of data that was originally inputed into terminal 20 of the encoder. As shown in FIG. 13, the interlaced video data is supplied to delay unit 72 to permit viewing of the video sequence.

The term "best mode" as used herein is used to identify a selected mode. Normally the mode selection is made to minimize pixel error signals to be transmitted to a decoder, however, the term is used to include reference to any available mode selected for use in a particular application.

Figure 15A:
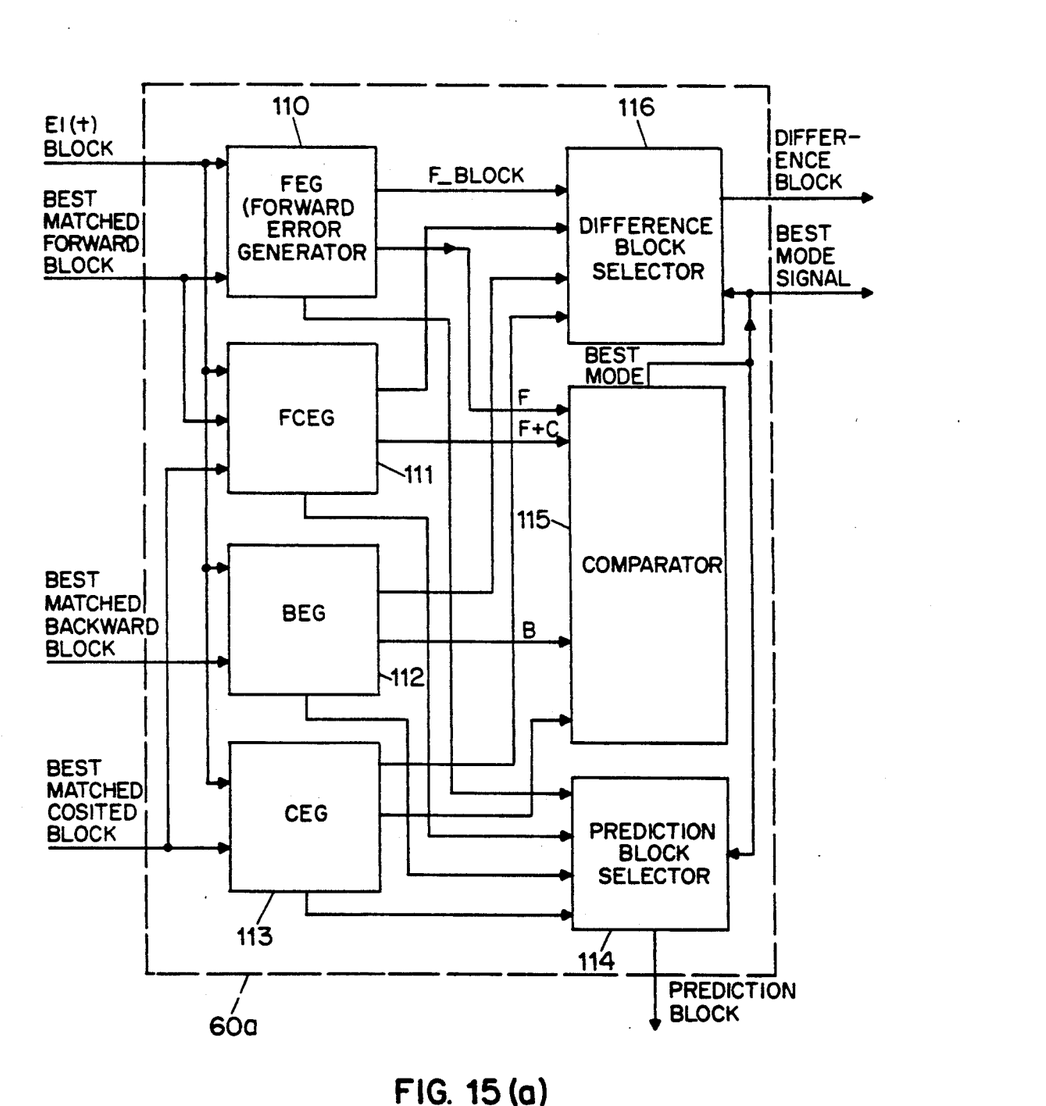
FIG. 15(a) shows an alternative arrangement of a best mode generator useful in the FIG. 1 encoder.

Combinations of modes, other than those described above are also available. FIG. 15(a) shows an arrangement of a best mode generator which uses a different set of modes. The FIG. 15(a) best mode generator compares the appropriate block in Ei(t) to the best matched future odd block, the best matched past odd block, the best matched past even block and to a block which is the average of the best matched future odd block and the best matched past even block. Error generator 110-113 carry out the appropriate comparisons. The other operations of the FIG. 15(a) best mode generator block are similar to that of the FIG. 8 best mode generator block.

Figure 15B:
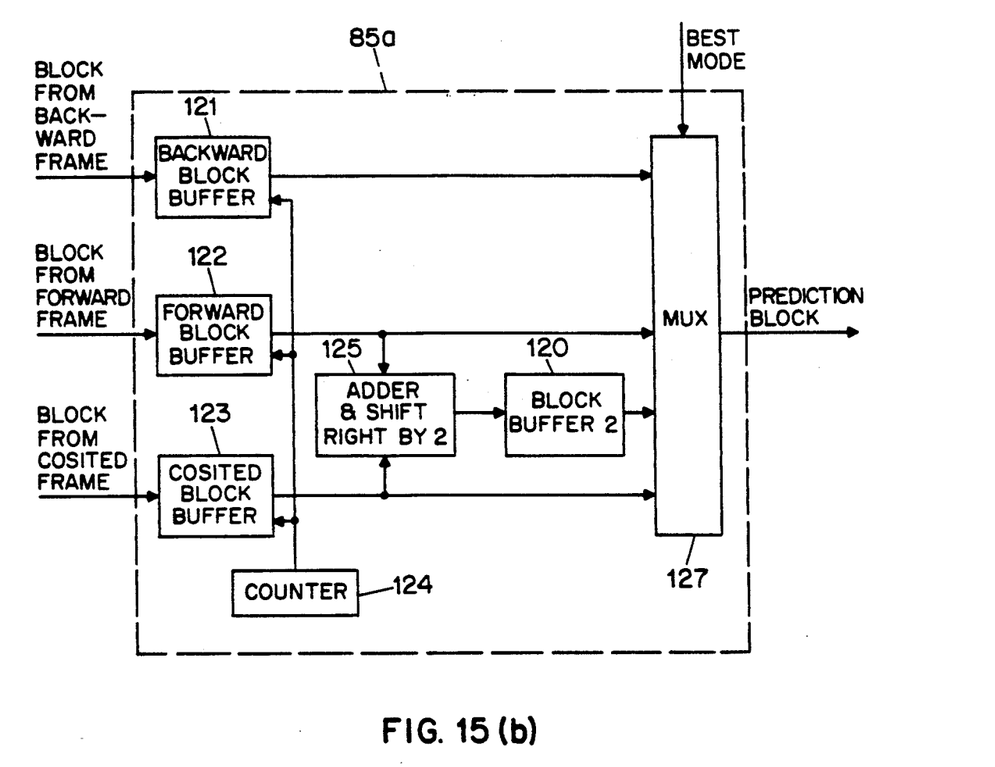
FIG. 15(b) shows a coupling unit corresponding to the FIG. 15(a) best mode generator.

FIG. 15(b) shows a suitable embodiment of a prediction block generator corresponding to the FIG. 15(a) best mode generator. Unit 125 generates the average of the future odd and past even best matched blocks while units 121-123 couple as appropriate the best matched past odd, future odd and past even blocks to unit 127. Unit 127 outputs the appropriate block responsive to the best mode signal.

Other arrangements are also possible. Original odd field data can be used for block matching purposes even if the odd field is being coded.

In another arrangement, the best mode generator could make comparisons based on only the past even field and the future odd field. Thus the best mode generator would require only 3 inputs.

In another alternative arrangement, the data received at terminal 20 can be interlaced data which has been compressed in to fall frames of data. In arrangements of this type, field delay unit 19 is not necessary.

In summary, methods and systems according to the invention contain various modes of operation. The following four modes were found to be most useful, but it is possible to have more, at the expense of increased complexity, including intrafield, backward, or even three-way averaging.

1. A "recursive", predictive, mode in which the past cosited even field is used for prediction. A motion vector must be sent, which often has zero values for stationary objects.

2. A "forward" mode, in which the future odd field is used for prediction. A motion vector must be sent.

3. An "averaged" mode, in which both past and future odd fields are used, by averaging the pixel values of the two optimum blocks. In that case, two motion vectors must be sent.

4. A "recursive averaged" mode, in which the previous even cosited field is combined as above, with the future odd field.

Methods and systems according to the invention, when combined with appropriate coding of the progressive sequence resulting from dropping the even fields of interlaced video, yields high quality compression with reasonable encoder complexity. This technique can be used for about 5 Mbits/s coding of standard-quality video coding, or for high-compression distribution-quality digital HDTV coding. Coding the quantized DCT coefficients must be optimized depending on their statistical nature, which, in turn, depends on the desired quality of the final reconstructed signal. If horizontal downsampling is avoided, then the resulting asymmetry between the horizontal and vertical frequencies must be considered when coding the DCT blocks, for optimum results. We have used 16×16 blocks for motion estimation and 8×8 blocks for DCT coding, but other configurations may be optimum, depending on the application, including, e.g., a quadtree-based segmented block matching approach using both 16×16 and 8×8 blocks. In our simulations, we have found that the even fields are coded with about 60% of the bit rate of the odd fields, with the same quality. The same concept can be used for HDTV coding at low bit rates (e.g. below 20 Mbits/s). There are various proposals for HDTV coding, using at least 70 Mbits/s. We also found that nonlinear edge preserving noise smoothing preprocessing greatly enhances coding performance, particularly in the case of coding noisy HDTV video signals.

While there have been described what are believed to be the preferred embodiments of the invention, those skilled in the art will recognize that other and further modifications may be made thereto without departing from the of the invention, and it is intended to claim all such embodiments as fall within the true scope of the invention.

We claim:

1. A system, for multi-mode predictive interpolative coding of fields of video, comprising:

input means for coupling current and later fields of interlaced data, such fields including even fields having pixel data for line positions at which pixel data is omitted in prior and later odd fields;

separator means, coupled to said input means, for separating said even fields of data from said odd fields of data;

delayed coupling means, coupled to said separation means to receive odd fields of data, for providing past odd field data;

storage means for storing data and for providing past even field data from storage;

interpolation means, coupled to said separation means and delayed coupling means to receive current even, future odd and past odd fields of data, for deriving and coupling to said storage means enhanced fields of data corresponding to each of said fields of data and having estimated pixel data at omitted line positions;

block matching means, coupled to said interpolation means and storage means, for comparing said current even enhanced field data with each of said future odd and past odd enhanced fields and said past even field data to develop motion vector signals indicative of location of best matched blocks of future odd, past odd and past even data, and for coupling said motion-vector signals to said storage means;

comparator means, coupled to said storage means, for utilizing blocks of pixel data retrieved from said storage means in response to said motion vector signals for performing a plurality of mode comparisons of a block of current even pixel data with different ones of said best matched blocks alone or on an averaged basis for deriving a best mode signal representative of a single best mode block having the least error and deriving pixel error signals representing pixel by pixel errors in said bets mode block; and output means, coupled to said comparator means and separator means, for providing said pixel error signals, best matched block location signals based on motion vector signals corresponding to said best mode signal, and odd field pixel data signals for transmission for use by a decoder.

2. An encoding and decoding system, comprising:

(a) a system in accordance with claim 1, for coding fields of interlaced video to provide output signals; and (b) a system, for decoding said output signals, comprising:

input means for coupling said output signals;

storage means, coupled to said input means, for storing fields of pixel data, including a future odd field and past odd and even fields;

address generator means, responsive to said location signals, for providing address signals to said storage means for retrieving one or more blocks of pixel data from said stored future odd and past odd and even fields;

block coupling means, responsive to blocks of data retrieved from said storage means, for providing a single best mode data block regardless of the number of blocks of pixel data simultaneously retrieved, and including means for averaging simultaneously retrieved blocks of pixel data;

block adder means, coupled to said input means and block coupling means, for combining said pixel error signals with said single best mode data block to provide a block of current even field pixel data; and combiner means, responsive to blocks of said current even field data and to said odd fields of pixel data, for providing video signals including alternating odd and even fields of data.

3. A coding system in accordance with claim 1, wherein said output means also provides said best mode signals for transmission for use by a decoder.

4. A coding system in accordance with claim 1, wherein said comparator means includes means for averaging blocks of pixel data from a past even field and a future odd field in deriving said best mode signal.

5. A system in accordance with claim 1, wherein said comparator means includes means for averaging blocks of pixel data from a past even field and a future odd field and averaging blocks of such data from past and future odd fields in deriving said best mode signal.

6. A coding system in accordance with claim 1, 4 or 5 wherein said comparator means includes means for averaging blocks of pixel data by adding two blocks of data on a pixel by pixel basis and reducing each resulting pixel value by a factor of two.

7. A coding system in accordance with claim 1, wherein said comparator means comprises:
first error generator means for deriving pixel error signals based on comparison of a block of current even field data with an average data block obtained by averaging a block of past even field data and a block of future odd field data.

8. A coding system in accordance with claim 7, wherein said comparator means additionally comprises:
second error generator means for deriving pixel error signals based on comparison of a block of current even field data with a block of past even field data.

9. A coding system in accordance with either of claims 7 or 8, wherein said comparator means additionally comprises:
third error generator means for deriving pixel error signals based on comparison of a block of current even field data with an average data block obtained by averaging a block of past odd field data and a block of future odd field data.

10. A coding system in accordance with either of claims 7 or 8, wherein said comparator means additionally comprises:
fourth error generator means for deriving pixel error signals based on a comparison of a block of current field data with a block of future odd field data; and
means for comparing the overall error represented by each of said pixel error signals to derive a best mode signal indicative of the pixel error signal representing the least overall error.

11. A system, for multi-mode predictive interpolative coding of fields of video, comprising:
input means for coupling current and later fields of interlaced data, such fields including current even fields having pixel data for line positions at which pixel data is omitted in past and future odd fields;
separator means, coupled to said input means, for separating said even fields of data from said odd fields of data;
delayed coupling means, coupled to said separation means to receive odd fields of data, for providing past odd field data;
storage means for storing data and for providing past even field data from storage;
block matching means, coupled to said separation means, delayed coupling means and storage means, for comparing current even field data with each of said future odd and past odd and even field data to develop motion vector signals indicative of locations of best matched blocks of future odd, past odd and past even data, and for coupling said motion-vector signals to said storage means;
comparator means, coupled to said storage means, for utilizing blocks of pixel data retrieved from said storage means in response to said motion vector signals for performing a plurality of mode comparisons of a block of current even pixel data with different ones of said best matched blocks alone or on an averaged basis for deriving a best mode signal representative of a single best mode block having the least error and deriving pixel error signals representing pixel by pixel errors in said best mode block; and
output means, coupled to said comparator means and separator means, for providing said pixel error signals, best matched block location signals based on motion vector signals corresponding to said best mode signal, and odd field pixel data signals for transmission for use by a decoder.

12. A coding system in accordance with claim 11, wherein said comparator means includes means for averaging blocks of pixel data from a past even field and a future odd field in deriving said best mode signal.

13. A system, for decoding coded fields of video, comprising:
input means for coupling location signals providing location data for best matched blocks, pixel error signals representative of pixel value errors in a best mode block relative to a current even field of pixel data, and odd field pixel data signals;
storage means, coupled to said input means, for storing fields of pixel data, including a future odd field and past odd and even fields;
address generator means, responsive to said location signals, for providing address signals to said storage means for retrieving one or more blocks of pixel data from said stored future odd and past odd and even fields;
block coupling means, responsive to blocks of data retrieved from said storage means, for providing a single best mode data block regardless of the number of blocks of pixel data simultaneously retrieved, and including means for averaging simultaneously retrieved blocks of pixel data;
block adder means, coupled to said input means and block coupling means, for combining said pixel error signals with said single best mode data block to provide a block of current even field pixel data; and
combiner means, responsive to blocks of said current even field data and to said odd fields of pixel data, for providing video signals including alternating odd and even fields of data.

14. A decoding system in accordance with claim 13, additionally comprising interpolation means, responsive to said odd fields of pixel data, for deriving and coupling to said storage means enhanced fields of data corresponding to said odd fields of data and having estimated pixel data inserted at omitted line positions.

15. A receiver, for decoding and displaying fields of video, comprising:
a decoder in accordance with claim 13; and
display means for displaying said video signals.

16. A decoding system in accordance with claim 13, wherein signals coupled by said input means also include best mode signals indicative of a block of data representing the least overall error and wherein said best mode signals are coupled to said address generator means for use in deriving address signals and to said block coupling means for controlling operation of said averaging means.

17. A decoding system in accordance with claim 16 wherein said input means couples location signals comprising motion vector signals.

18. A decoding system in accordance with claim 13, wherein said block coupling means includes means for averaging blocks of pixel data from a past even field and a future odd field for deriving a best mode data block.

19. A decoding system in accordance with claim 13, wherein said block coupling means includes means for averaging blocks of pixel data from a past even field and a future odd field, and means for averaging blocks of pixel data from a past odd field and a future odd field, for deriving a best mode data block.

20. A decoding system in accordance with claim 13, wherein said block coupling means includes means for averaging blocks of pixel data when two blocks of such data are simultaneously retrieved, and for coupling to an output without modification singly retrieved blocks of such data.

21. A decoding system in accordance with claim 13, 18, 19 or 20 wherein said block coupling means includes means for averaging blocks of pixel data by adding two blocks of data on a pixel by pixel basis and reducing each resulting pixel value by a factor of two.

22. A method, for coding multi-mode predictive interpolative coded fields of video, comprising the steps of:
   (a) providing a current field of interlaced pixel data, and past and future fields of such data;
   (b) providing estimated pixel data at omitted line positions in said past and future fields of data to form enhanced fields of pixel data;
   (c) comparing a block of pixel data from said current field with corresponding blocks of data from said past and future fields to derive motion vector signals indicative of best matched blocks of data;
   (d) developing pixel error signals representing pixel by pixel errors based on utilization of said best matched blocks in different modes for comparison with said block of pixel data from said current field and developing best mode signals indicative of which of said modes represents the least overall error; and
   (e) providing said best mode signals, motion vector signals, pixel error signals, and said future field of data for transmission for use by a decoder.

23. A decoding method comprising:
   (a) receiving signals provided in accordance with claim 22, including pixel error signals representative of pixel value errors in a best mode block relative to a current even field of data;
   (b) storing fields of pixel data which, relative to said current even field, include a future odd field and past odd and even fields;
   (c) deriving, with use of said location signals, address signals used in retrieving from storage one or more blocks of pixel data from said stored future odd and past odd and even fields;
   (d) providing an averaging function, responsive to blocks of pixel data retrieved in step (c), to provide a single best mode data block regardless of the number of blocks of pixel data simultaneously retrieved from storage;
   (e) combining said best mode data block with said pixel error signals to derive a block of current even field pixel data; and
   (f) assembling even fields of data for combination with said odd fields of data to provide video signals including alternating odd and even fields.

24. A method in accordance with claim 22, wherein the fields of pixel data provided in step (a) include a current even field, a future odd field and past odd and even fields of data and step (d) includes a comparison mode in which said block of pixel data from said current even field is compared with a block of data representing an average of corresponding blocks of data from said future odd and past even fields of data.

25. A method in accordance with claim 22, wherein the fields of pixel data provided in step (a) include a current even field, a future odd field and past odd and even fields of data and step (d) includes a comparison mode in which said block of pixel data from said current even field is compared with a block of data representing an average of corresponding blocks of data from said future odd and past even fields of data and an additional comparison mode in which said current even field block is compared with a block of data representing an average of corresponding blocks of data from said past and future odd fields of data.

26. A method in accordance with claim 22, 24 or 25 additionally comprising the step of receiving an interlaced video signal and separating said signal into odd and even fields of interlaced pixel data.

27. A method in accordance with claim 22, 24 or 25 additionally comprising the steps of storing and retrieving fields of pixel data and motion vector signals.

28. A method in accordance with claim 22, 24 or 25 additionally comprising the steps of compression coding odd fields of pixel data and combining best mode signals, motion vector signals, pixel error signals and said coded odd fields into a combined signal for transmission for use by a decoder.

29. A method, for coding multi-mode predictive interpolative coded fields of video, comprising the steps of:
   (a) providing a current field of interlaced pixel data, and past and future fields of such data;
   (b) comparing a block of pixel data from said current field with corresponding blocks of data from said past and future fields to derive motion vector signals indicative of best matched blocks of data;
   (c) developing pixel error signals representing pixel by pixel errors based on utilization of said best matched blocks in different modes for comparison with said block of pixel data from said current field and developing best mode signals indicative of which of said modes represents the least overall error; and
   (d) providing said best mode signals, motion vector signals, pixel error signals, and said future field of data for transmission for use by a decoder.

30. A method, for decoding coded fields of video, comprising the steps of:
   (a) receiving location signals providing location data for best matched blocks of data, pixel error signals representative of pixel value errors in a best mode block relative to a current even field of data, and odd field pixel data signals;
   (b) storing fields of pixel data which, relative to said current even field, include a future odd field and past odd and even fields;
   (c) deriving, with use of said location signals, address signals used in retrieving from storage one or more blocks of pixel data from said stored future odd and past odd and even fields;
   (d) providing an averaging function, responsive to blocks of pixel data retrieved in step (c), to provide a single best mode data block regardless of the number of blocks of pixel data simultaneously retrieved from storage;
   (e) combining said best mode data block with said pixel error signals to derive a block of current even field pixel data; and
   (f) assembling even fields of data for combination with said odd fields of data to provide video signals including alternating odd and even fields.

31. A decoding method in accordance with claim 30, additionally comprising the step of decoding said odd fields of pixel data in a manner compatible with data compression coding provided prior to data transmission.

32. A decoding method in accordance with claim 30, wherein said signals received in step (a) also include best mode signals indicative of a block of data representing the least overall error, and wherein said best mode signals are made available for use in deriving address signals in step (c) and for controlling said averaging function in step (d).

33. A decoding method in accordance with claim 32, wherein step (d) includes averaging on a pixel by pixel basis corresponding blocks of data from said future odd and past odd blocks of data, when said two blocks of data are simultaneously retrieved in step (c).

34. A decoding method in accordance with claim 30, wherein step (d) includes averaging on a pixel by pixel basis corresponding blocks of data from said future odd and past even blocks of data, when said two blocks of data are simultaneously retrieved in step (c).

35. A decoding method in accordance with claim 30, 34 or 33 wherein said step (d) includes averaging blocks of data, when two blocks are simultaneously retrieved in step (c), by adding said two blocks on a pixel by pixel basis and reducing each resulting pixel value by a factor of two.

36. A system, for multi-mode predictive interpolative coding of fields of video, comprising:
   input means for coupling current and later fields of interlaced data, such fields including current even fields having pixel data for line positions at which pixel data is omitted in past and future odd fields;
   separator means, coupled to said input means, for separating said even fields of data from said odd fields of data;
   storage means for storing data and for providing the nearest in time past even field data then available, relative to said current even field of data;
   block matching means, coupled to said separation means and storage means, for comparing current even field data with said future odd and past even field data to develop motion vector signals indicative of locations of best matched blocks of future odd and past even data, and for coupling said motion-vector signals to said storage means;
   comparator means, coupled to said storage means, for utilizing blocks of pixel data retrieved from said storage means in response to said motion vector signals for performing a plurality of mode comparisons of a block of current even pixel data with different ones of said best matched blocks alone or on an averaged basis for deriving a best mode signal representative of a single best mode block having the least error and deriving pixel error signals representing pixel by pixel errors in said best mode block; and
   output means, coupled to said comparator means and separator means, for providing said pixel error signals, best matched block location signals based on motion vector signals corresponding to said best mode signal, and odd field pixel data signals for transmission for use by a decoder.

37. A system, for multi-mode predictive interpolative coding of fields of video, comprising:
   input means for coupling current and later fields of interlaced data, such fields including current even fields having pixel data for line positions at which pixel data is omitted in past and future odd fields;
   separator means, coupled to said input means, for separating said even fields of data from said odd fields of data;
   delayed coupling means, coupled to said separation means to receive odd fields of data, for providing the nearest in time past odd field data then available, relative to said current even field of data;
   storage means for storing data and for providing the nearest in time past odd field data then available, relative to said current even field of data;
   block matching means, coupled to said separation means and storage means, for comparing current even field data with said future odd and even past field data to develop motion vector signals indicative of locations of best matched blocks of future odd and past even data, and for coupling said motion-vector signals to said storage means;
   comparator means, coupled to said storage means, for utilizing blocks of pixel data retrieved from said storage means in response to said motion vector signals for performing a plurality of mode comparisons of a block of current even pixel data with different ones of said best matched blocks alone or on an averaged basis for deriving a best mode signal representative of a single best mode block having the least error and deriving pixel error signals representing pixel by pixel errors in said best mode block; and
   output means, coupled to said comparator means and separator means, for providing said pixel error signals, best matched block location signals based on motion vector signals corresponding to said best mode signal, and odd field pixel data signals for transmission for use by a decoder.

38. A coding system in accordance with claim 36 or 37, wherein said comparator means includes means for averaging blocks of pixel data from a past even field and a future odd field in deriving said best mode signal.

39. A coding system in accordance with claim 36 or 37, additionally including interpolation means, coupled to said separation means, for deriving and coupling to said block matching means odd and even field data corresponding to odd and even fields of data having estimated pixel data at omitted line positions.

40. A system, for decoding coded fields of video, comprising:
   input means for coupling location signals providing location data for best matched blocks, pixel error signals representative of pixel value errors in a best mode block relative to a current even field of pixel data, and odd field pixel data signals;
   storage means, coupled to said input means, for storing fields of pixel data, including a future odd field and a past even field;
   address generator means, responsive to said location signals, for providing address signals to said storage means for retrieving one or more blocks of pixel data from said stored future odd and past even fields;
   block coupling means, responsive to blocks of data retrieved from said storage means, for providing a single best mode data block regardless of the number of blocks of pixel data simultaneously retrieved, and including means for averaging simultaneously retrieved blocks of pixel data;
   block adder means, coupled to said input means and block coupling means, for combining said pixel error signals with said single best mode data block to provide a block of current even field pixel data; and combiner means, responsive to blocks of said current even field data and to said odd fields of pixel data, for providing video signals including alternating odd and even fields of data.

41. A decoding system in accordance with claim 40, wherein said block coupling means includes means for averaging blocks of pixel data from a past even field and a future odd field for deriving a best mode data block.

42. A decoding system in accordance with claim 40, wherein said block coupling means includes means for averaging blocks of pixel data when two blocks of such data are simultaneously retrieved, and for coupling to an output without modification singly retrieved blocks of such data.

43. A method, for decoding coded fields of video, comprising the steps of:

(a) receiving location signals providing location data for best matched blocks of data, pixel error signals representative of pixel value errors in a best mode block relative to a current even field of data, and odd field pixel data signals;

(b) storing fields of pixel data which, relative to said current even field, include a future odd field and past even fields;

(c) deriving, with use of said location signals, address signals used in retrieving from storage one or more blocks of pixel data from said stored future odd and past even fields;

(d) providing an averaging function, responsive to blocks of pixel data retrieved in step (c), to provide a single best mode data block regardless of the number of blocks of pixel data simultaneously retrieved from storage;

(e) combining said best mode data block with said pixel error signals to derive a block of current even field pixel data; and (f) assembling even fields of data for combination with said odd fields of data to provide video signals including alternating odd and even fields.

44. A decoding method in accordance with claim 43, wherein said signals received in step (a) also include best mode signals indicative of a block of data representing the least overall error, and wherein said best mode signals are made available for use in deriving address signals in step (c) and for controlling said averaging function in step (d).

45. A decoding method in accordance with claim 43, wherein step (d) includes averaging on a pixel by pixel basis corresponding blocks of data from said future odd and past even blocks of data, when said two blocks of data are simultaneously retrieved in step (c).

* * * * *